(12) United States Patent
Sarin et al.

(10) Patent No.: US 9,031,847 B2
(45) Date of Patent: May 12, 2015

(54) VOICE-CONTROLLED CAMERA OPERATIONS

(75) Inventors: Raman Kumar Sarin, Redmond, WA (US); Joseph H. Matthews, III, Woodinville, WA (US); James Kai Yu Lau, Bellevue, WA (US); Monica Estela Gonzalez Veron, Seattle, WA (US); Jae Pum Park, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 13/297,116

(22) Filed: Nov. 15, 2011

(65) Prior Publication Data

US 2013/0124207 A1 May 16, 2013

(51) Int. Cl.
  *G10L 21/00* (2013.01)
  *G10L 15/22* (2006.01)
  *H04N 5/232* (2006.01)
  *G06F 3/16* (2006.01)

(52) U.S. Cl.
  CPC ............... *G10L 15/22* (2013.01); *H04N 5/232* (2013.01); *G10L 2015/223* (2013.01); *G06F 3/167* (2013.01)

(58) Field of Classification Search
  CPC ... G10L 17/22; G10L 17/24; G10L 2015/088; G10L 2015/223
  USPC .......................................... 704/270, 275, 251
  See application file for complete search history.

(56) References Cited

U.S. PATENT DOCUMENTS 4,389,109 A * 6/1983 Taniguchi et al. ............... 396/56
4,951,079 A * 8/1990 Hoshino et al. ................. 396/56
5,980,124 A * 11/1999 Bernardi et al. ............... 396/428
5,983,186 A * 11/1999 Miyazawa et al. ............ 704/275
6,006,187 A * 12/1999 Tanenblatt .................... 704/260
6,070,140 A * 5/2000 Tran .............................. 704/275

(Continued)

FOREIGN PATENT DOCUMENTS

WO     WO 2009104195 A1 *  8/2009     ............ H04M 1/247

OTHER PUBLICATIONS

Golson, "iOS 5 Camera: Volume Shutter, Lock Screen, Remote Triggering—Mac Rumors", 2011 www.macrumors.com/2011/10/13/ios-5-camera-volume-shutter-lock-screen-remote-triggering/.*

(Continued)

*Primary Examiner* — Douglas Godbold
(74) *Attorney, Agent, or Firm* — Henry Gabryjelskji; Kate Drakos; Micky Minhas

(57) ABSTRACT

A computing device (e.g., a smart phone, a tablet computer, digital camera, or other device with image capture functionality) causes an image capture device to capture one or more digital images based on audio input (e.g., a voice command) received by the computing device. For example, a user's voice (e.g., a word or phrase) is converted to audio input data by the computing device, which then compares (e.g., using an audio matching algorithm) the audio input data to an expected voice command associated with an image capture application. In another aspect, a computing device activates an image capture application and captures one or more digital images based on a received voice command. In another aspect, a computing device transitions from a low-power state to an active state, activates an image capture application, and causes a camera device to capture digital images based on a received voice command.

20 Claims, 12 Drawing Sheets

(56) References Cited

U.S. PATENT DOCUMENTS

| | | | | |
|---|---|---|---|---|
| 6,101,338 | A * | 8/2000 | Bernardi et al. | 396/287 |
| 6,192,343 | B1 | 2/2001 | Morgan | |
| 6,289,140 | B1 * | 9/2001 | Oliver | 382/313 |
| 7,080,014 | B2 * | 7/2006 | Bush et al. | 704/275 |
| 7,697,827 | B2 * | 4/2010 | Konicek | 396/56 |
| 7,904,023 | B2 * | 3/2011 | Viitamaki et al. | 455/41.2 |
| 8,340,975 | B1 * | 12/2012 | Rosenberger | 704/275 |
| 8,452,597 | B2 * | 5/2013 | Bringert et al. | 704/251 |
| 2002/0072918 | A1 * | 6/2002 | White et al. | 704/270.1 |
| 2002/0107694 | A1 * | 8/2002 | Lerg | 704/273 |
| 2004/0054539 | A1 * | 3/2004 | Simpson | 704/270.1 |
| 2005/0203740 | A1 * | 9/2005 | Chambers et al. | 704/254 |
| 2006/0136221 | A1 | 6/2006 | James et al. | |
| 2006/0293897 | A1 * | 12/2006 | White et al. | 704/270.1 |
| 2007/0088556 | A1 | 4/2007 | Andrew | |
| 2007/0132413 | A1 * | 6/2007 | Mays | 318/280 |
| 2008/0036869 | A1 * | 2/2008 | Gustafsson et al. | 348/222.1 |
| 2008/0071547 | A1 * | 3/2008 | Prieto et al. | 704/275 |
| 2008/0215337 | A1 * | 9/2008 | Greene et al. | 704/275 |
| 2009/0043580 | A1 * | 2/2009 | Mozer et al. | 704/251 |
| 2009/0215503 | A1 * | 8/2009 | Zhang et al. | 455/569.1 |
| 2010/0088100 | A1 | 4/2010 | Lindahl | |
| 2010/0134677 | A1 * | 6/2010 | Yamamoto et al. | 348/333.01 |
| 2010/0169098 | A1 * | 7/2010 | Patch | 704/275 |
| 2010/0185448 | A1 * | 7/2010 | Meisel | 704/256.1 |
| 2010/0312547 | A1 | 12/2010 | Van Os et al. | |
| 2013/0339028 | A1 * | 12/2013 | Rosner et al. | 704/275 |

OTHER PUBLICATIONS

Anumanchipalli et al., "Significance of Early Tagged Contextual Graphemes in Grapheme Based Speech Synthesis and Recognition Systems," *ICASSP 2008: IEEE Int'l Conf. on Acoustics, Speech and Signal Processing*, pp. 4645-4648 (Mar.-Apr. 2008).

Cheung, "Sony Launches T200 and T70 with Smile Shutter," http://www.digitalcamerainfo.com/content/Sony-Canada-Launches-T200-and-T70-with-Smile-Shutter--15025.htm, 7 pp. (Aug. 2007).

Digital Photography Review, "Canon launches PowerShot SX120 IS super-zoom," http://www.dpreview.com/news/0908/09081903canonsx120is.asp, 3 pp. (Aug. 2009).

Goldman, "Canon PowerShot SD1400 IS Review," http://reviews.cnet.com/digital-cameras/canon-powershot-sd1400-is/4505-6501_7-33975901.html, 12 pp. (Apr. 2010).

Hollister, "Would you buy a voice-controlled camera, or perhaps a DSLR with touchsceen?" http://www.engadget.com/2010/06/09/would-you-buy-a-voice-controlled-camera-or-perhaps-a-dslr-with/, 3 pp. (Jun. 2010).

Lee, "BlueAnt Q1 Review," http://reviews.cnet.com/headsets/blueant-q1/4505-13831_7-33485028.html, 9 pp. (Apr. 2009).

Lee, "Plantronics Savor M1100 Review," http://reviews.cnet.com/headsets/plantronics-savor-m1100/4505-13831_7-34188145.html, 7 pp. (Sep. 2010).

"LG Mobile Phones Launches New Voice Command Handset with Alltel Communications" http://www.lg.com/us/press-release/article/lg-mobile-phones-launches-new-voice-command-handset-with-alltel-communications.jsp, 2 pp. (Aug. 2004).

Maselli, "Microsoft Voice Command for the Pocket PC," http://www.mobiletechreview.com/software/MS_VoiceCommand_PPC.htm, 2 pp. (Dec. 2003).

Moynihan, "Canon Adds Fun Features to New PowerShot Cameras," http://www.pcworld.com/article/188807/canon_adds_fun_features_to_new_powershot_cameras.html, 3 pp. (Feb. 2010).

Nistor, "Voice Command for iPhone 3G," http://bindapple.com/voice-command-for-iphone-3g/, 3 pp. (Jul. 2008).

Reagan, "Canon Voice Recognition Patent: 'Say Cheese,'" 8 pp., http://www.photographybay.com/2010/06/05/canon-voice-recognition-camera-patent-say-cheese/ (Jun. 2010).

Rodriguez, "Running a Windows Phone Application under the lock screen," http://blogs.msdn.com/b/jaimer/archive/2010/11/01/running-a-windows-phone-application-under-the-lock-screen.aspx, 3 pp. (Nov. 2010).

Sony Ericsson, "Feature Guide: Video Calls and Voice Dialing: Keeping in Touch using voice and video," 8 pp. (Aug. 2009).

* cited by examiner

Software 1180 implementing described technology

VOICE-CONTROLLED CAMERA OPERATIONS

BACKGROUND

With the increasing popularity of computing devices (e.g., smart phones) having image capture functionality, there is a need for improving the user experience by allowing quick access to image-capture functionality. Image capture operations on smart phones are typically initiated by physical contact with the device (e.g., by tapping a touchscreen or pressing a hardware button). Some computing devices provide dedicated hardware buttons (e.g., camera shutter buttons) to provide access to image capture functionality. However, there are situations when such interactions are not convenient for the user. For example, when taking a digital photograph with a smart phone, pressing a hardware button may cause camera shake, thereby distorting the resulting image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a computing device (e.g., a smart phone, tablet computer, digital camera, or other device with image capture functionality) causes an image capture device to capture one or more digital images based on audio input (e.g., a voice command) received by the computing device. For example, a user speaks a word or phrase, and the user's voice is converted to audio input data by the computing device. The computing device compares (e.g., using an audio matching algorithm) the audio input data to an expected voice command associated with an image capture application, and determines whether the word or phrase spoken by the user matches the expected voice command, In another aspect, a computing device activates an image capture application on the computing device and captures one or more digital images based on a voice command received by the computing device. In another aspect, a computing device transitions from a low-power state to an active state, activates an image capture application, and causes a camera device to capture digital images based on a voice command received by the computing device. In the low-power state, the computing device listens for voice commands that can cause a transition to the active state. The technologies described herein are useful, for example, for performing image capture functions without making physical contact with a device (e.g., to avoid camera shake, or to allow a subject of a photo in a self-portrait or group photo to initiate an image capture operation without touching the device or setting a timer) and without navigating through a menu system.

The foregoing and other objects, features, and advantages of the invention will become more apparent from the following detailed description, which proceeds with reference to the accompanying figures.

DETAILED DESCRIPTION

Figure 1:
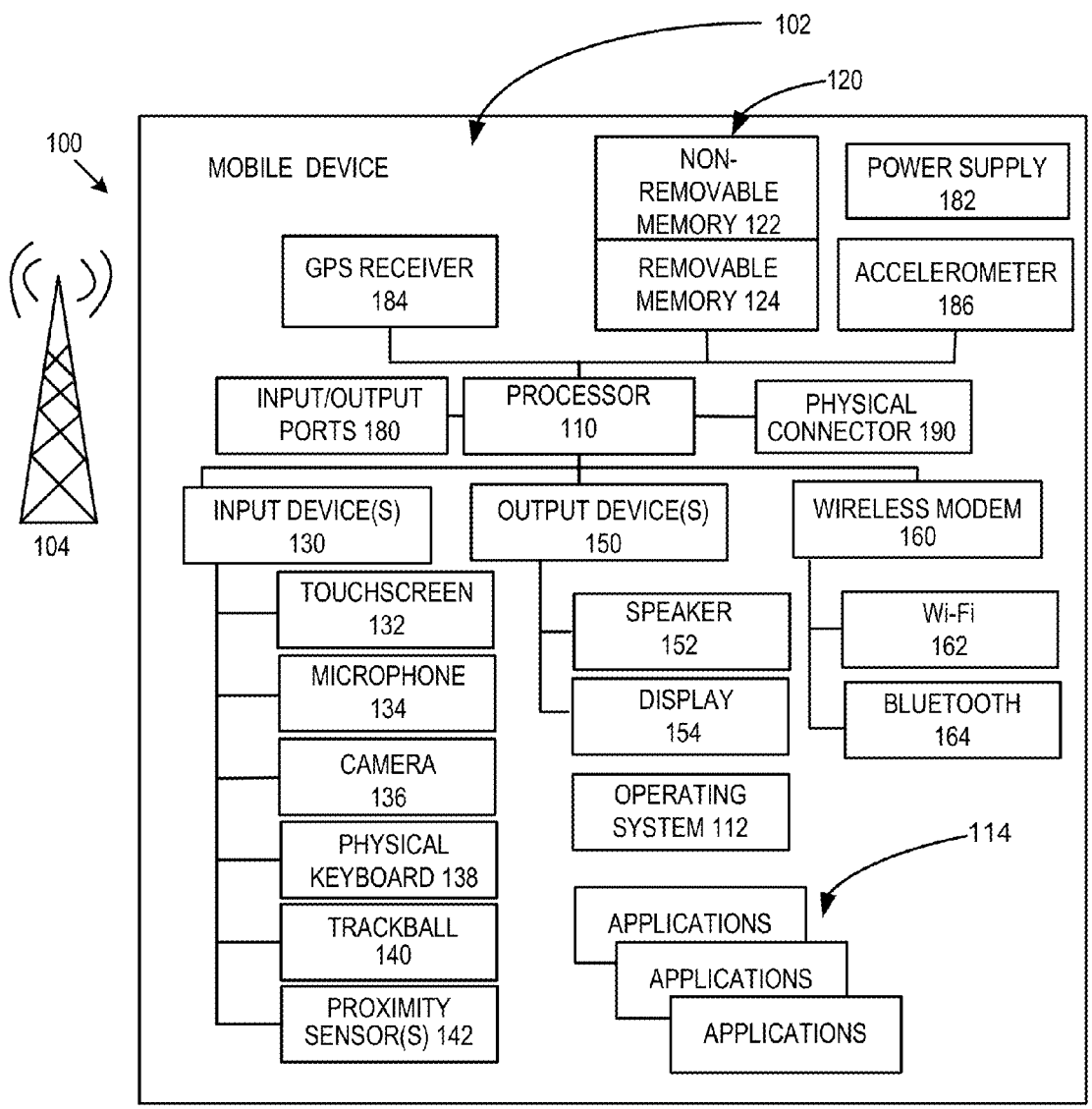
FIG. 1 is a system diagram depicting an exemplary mobile device, including a variety of optional hardware and software components.

Techniques and tools are described for voice-controlled image capture operations. Certain embodiments of the disclosed technology allow the end user to perform image capture operations with voice commands to facilitate a fast, hands-free image capture experience. Certain embodiments of the disclosed technology allow recognition of voice commands based on context, and do not require a user to explicitly select a voice recognition mode prior to speaking a voice command. Certain embodiments of the disclosed technology also can be applied to other functionality (e.g., video or audio recording), in addition to image capture functionality. Certain embodiments described herein are useful, for example, for performing image capture functions without making physical contact with a device (e.g., to avoid camera shake, or to allow a subject of a photo in a self-portrait or group photo to initiate an image capture operation without touching the device or setting a timer) and without navigating through a menu system. As used herein, the term "voice-controlled" refers generally to operations performed by a computing device responsive to sound. The term "voice-controlled" is used in view of an exemplary scenario in which a human user issues a voice command (such as a spoken word or phrase) to control image capture operations on a computing device (e.g., a smart phone or tablet computer, a digital camera, or some other computing device with image capture functionality). However, embodiments described herein are not limited to control by human voice.

The examples described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed things and methods can be used in conjunction with other things and methods. Additionally, the description sometimes uses terms like "determine," "compare," and "capture" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. The disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

I. Exemplary Mobile Devices

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smart phone, handheld computer, tablet computer, etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 in various ways, such as by managing transitions between device states such as transitions between active states and low-power states, or transitions between locked and unlocked states, and can provide support for one or more application programs 114. The application programs can include common mobile computing applications (e.g., image-capture applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as smart cards. The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touchscreen 132 and display 154 can be combined into a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, a gyroscope (not shown), and/or a physical connector 190, which can be a USB port, IEEE 1394 (FireWire) port, and/or RS-232 port. The illustrated components 102 are not required or all-inclusive, as any components can be deleted and other components can be added.

Figure 2A:
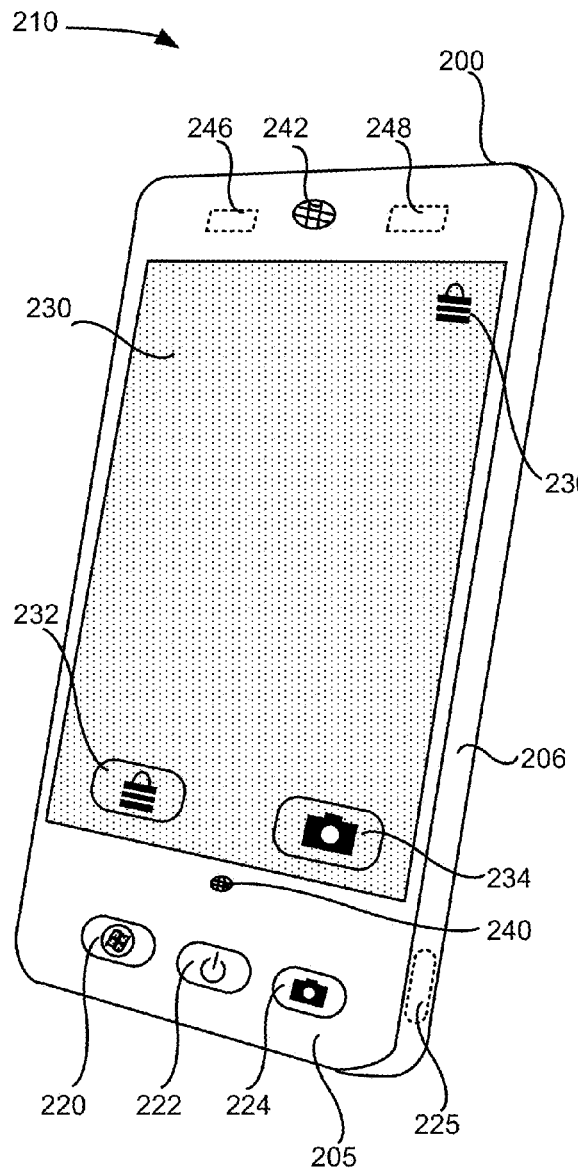
FIGS. 2A and 2B are diagrams that illustrate a generalized example of a mobile device.
Figure 2B:
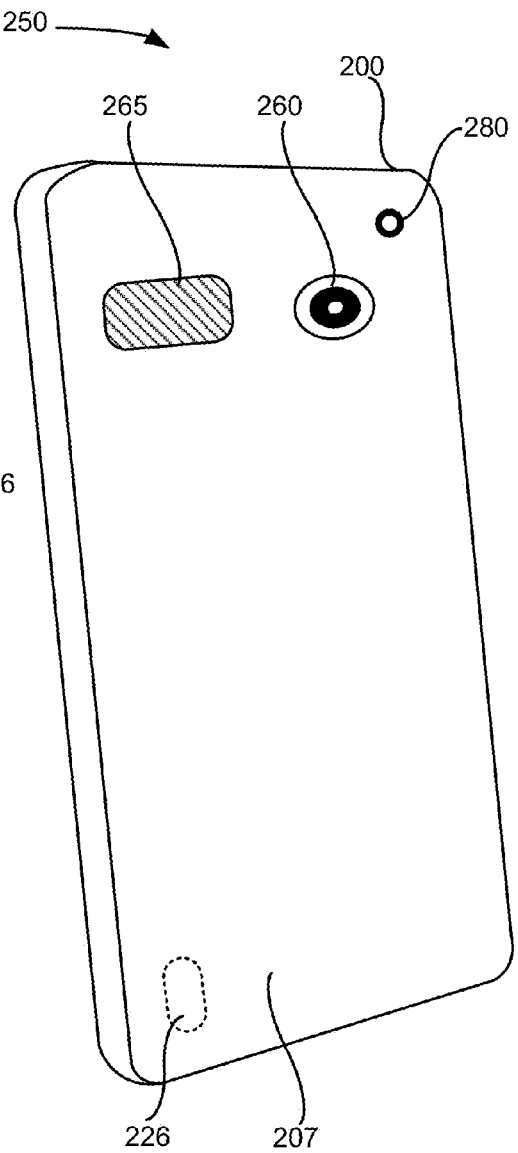

FIG. 2A depicts a front view 210 of an example mobile device 200, while FIG. 2B depicts a rear view 250 of the mobile device. As shown, the mobile device 200 includes several hardware buttons, including a home button 220, a power button 222, and a camera shutter (image-capture) button 224. Also depicted is a touchscreen display 230, which is shown displaying a touchscreen unlock button 232, a touchscreen camera shutter button 234, and a locked-mode indicator 236.

The mobile device 200 includes a microphone 240 and speaker 242, along with two proximity sensors 246 and 248, situated below the surface of the mobile device. In some examples, the proximity sensors 246 and 248 emit an infrared beam and receive a reflected infrared beam, which is reflected off the surface of a nearby object that has been illuminated by the emitted infrared beam. In other examples, the touchscreen display 230 can be used as a proximity sensor. In other examples, an image sensor coupled with a camera lens 260 can be used as a light sensor to detect an object in proximity with the mobile device 200. In other examples, a photodiode 280 can be used as a light sensor. In other examples, signals from one or more proximity sensors (e.g., proximity sensors 246 and 248, and/or the touchscreen display 230) can be combined with signals from a light sensor (e.g., an image sensor coupled with camera lens 260 and/or a photodiode 280) in order to determine objects in proximity with the mobile device 200 with improved accuracy.

The camera shutter button 224 of the mobile device 200 can be a dedicated single-action camera shutter button, or a dedicated dual-action camera shutter button with the ability to detect "half-press" (partial actuation) and "full-press" (further actuation) as distinct actions. In some examples, the dual action camera shutter button 224 has different attributes associated with half-press and full-press actions.

Turning to the rear view 250 shown in FIG. 2B, the example mobile device 200 includes the camera lens 260 and an electronic flash 265. The individual components (e.g., the hardware buttons 220, 222, and 224, microphone 240, speaker 242, touchscreen display 230, camera lens 260 and flash 265) can be coupled to a mobile device chassis (not shown), which is connected to internal components of the mobile device 200, for example: one or more processors, a power supply, and a modem.

The placement of components on the mobile device 200, such as the home button 220, power button 222, camera shutter button 224, the camera lens 260, electronic flash 265, proximity sensors 246 and 248, and the photodiode 280, can vary depending on implementation. The components shown in FIGS. 2A and 2B are not required or all-inclusive, as any components can be deleted and other components can be added.

II. Exemplary Architecture For Voice-Controlled Image Capture Tool

Figure 3:
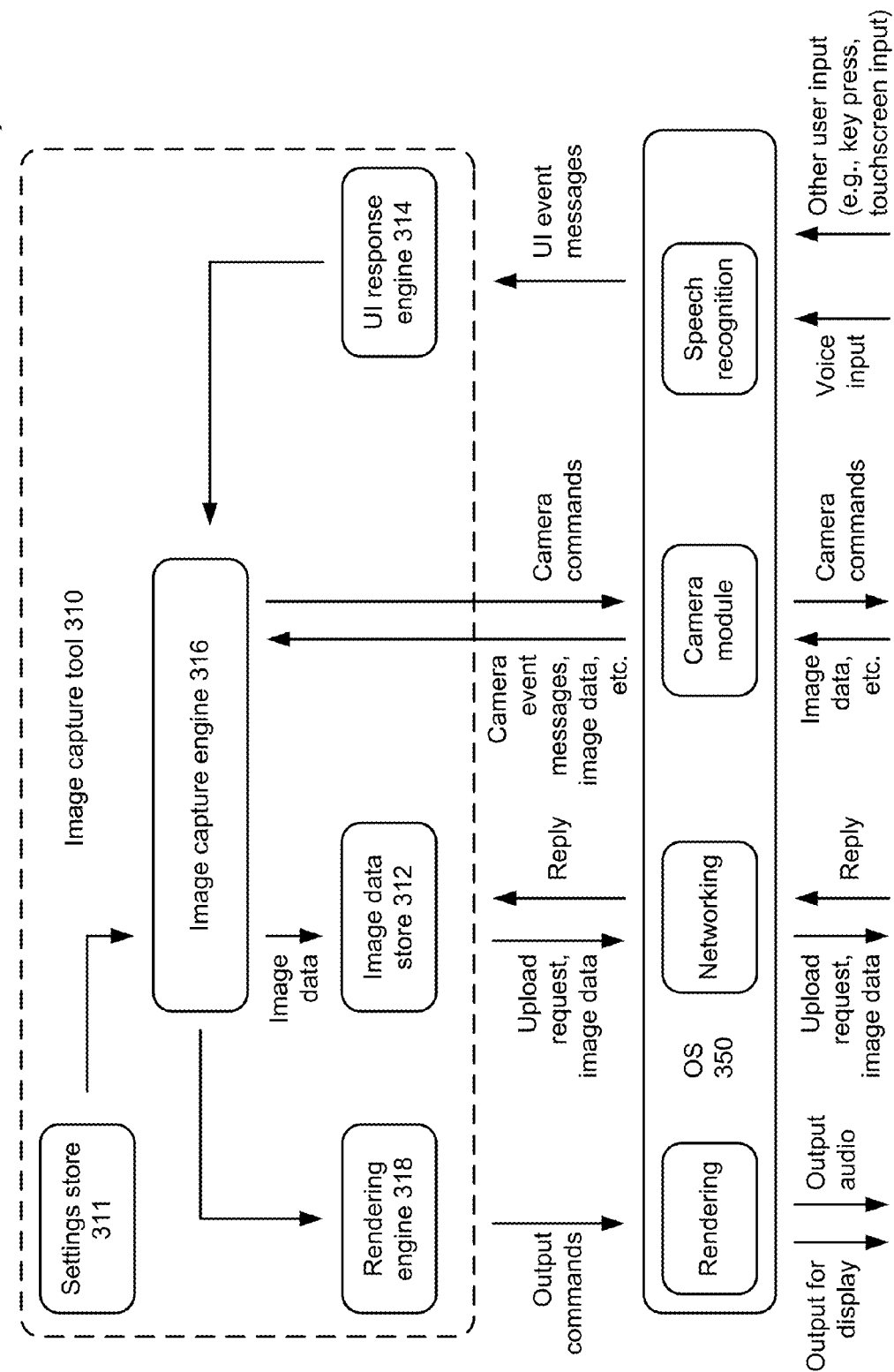
FIG. 3 is a block diagram illustrating an example software architecture for an image capture tool that responds to voice commands.

FIG. 3 shows an example software architecture 300 for an image capture tool 310 that can cause digital images to be captured in response to voice commands. A client computing device (e.g., smart phone or other mobile computing device) can execute software organized according to the architecture 300.

The architecture 300 includes a device operating system (OS) 350 and image capture tool 310. In the example shown in FIG. 3, the device OS 350 includes components for rendering (e.g., rendering visual output to a display, generating voice output for a speaker), components for networking, components for controlling and communicating with a camera device, and components for speech recognition. Alternatively, components indicated as being included in device OS 350 (e.g., speech recognition components) can be implemented in whole or in part on remote servers. For example, an audio matching algorithm can match input audio with expected voice commands on one or more local main processors, one or more local processors dedicated to speech recognition, one or more processors on a remote server, or some combination. The device OS 350 can manage user input functions, output functions, camera functions, storage access functions, network communication functions, and other functions for the device. The device OS 350 can provide access to such functions to the image capture tool 310.

Components for speech recognition can include, for example, a speech recognition engine that uses the Microsoft® Speech Application Programming Interface (SAPI) and/or a Microsoft® Tellme® interactive voice response service to listen for and interpret voice input. Components for speech recognition in the device OS 350 can be used with the image capture tool 310 to listen for and interpret voice commands related to, e.g., image capture operations. Speech recognition for technologies disclosed herein can be implemented in a context of generalized voice input modes. For example, in addition to image capture operations, components for speech recognition also can be used for other applications and functionality such as voice calls (e.g., to answer, ignore, or silence incoming calls) and search functions (e.g., to perform searches on a local device, a remote server, or the Internet). Speech recognition (e.g., for generalized voice input modes) can be implemented in software such as stand-alone applications or plug-ins. Services such as the Microsoft® Bing® service, or Apple Inc.'s Siri service can be used to implement speech recognition (e.g., in generalized voice input modes) for technologies described herein.

A user can generate user input that affects camera control and handling of digital image data. The user input can be, for example, voice input or tactile input such as touchscreen input, button presses, or key presses. The device OS 350 can include functionality for recognizing commands from voice input, button input or key press input, recognizing taps, finger gestures, etc. to a touchscreen from tactile input, and creating user input event messages that can be used by image capture tool 310 or other software. The UI response engine 314 of the image capture tool 310 listens for user input event messages from the device OS 350 and determines appropriate responses to the UI event messages. The UI event messages can indicate voice command input or other UI events (e.g., from touchscreen gesture or tap input, button presses, directional buttons, trackball input). If appropriate, the UI response engine 314 can translate the UI event messages from the OS 350 into command events (e.g., image capture messages) sent to an image capture engine 316 of the image capture tool 310.

Command events can cause the image capture engine 316 to invoke image capture operations.

The image capture engine 316 can consider current settings (possibly provided from the settings store 311), and any messages from the UI response engine 314 that relate to image capture. From this information, the image capture engine 316 can determine whether and how to perform image capture operations. The image capture engine 316 can store captured image data to an image data store 312. Captured images can be stored and processed locally or uploaded from image data store 312 to remote storage on network resources. The device OS 350 mediates access to the storage and network resources. The characteristics and organization of the image data (e.g., compression, resolution, size, file format) depends on implementation. Views of captured images, audio feedback (e.g., sound effects such as shutter clicks, voice feedback), or other output can be rendered by the rendering engine 318. The rendering engine 318 can provide output commands for the rendered view to the device OS 350 for output on a display. The rendering engine 318 can also provide output commands to the device OS 350 for output over a speaker or headphones. The exact operations performed as part of the rendering depend on implementation.

Alternatives to the example architecture 300 shown in FIG. 3 also can be used. For example, generalized voice input tools can be used to implement generalized voice input modes. A generalized voice input tool can accept voice input for more than one function (e.g., search functionality, voice call functionality). Voice commands used in described technologies (e.g., voice commands used to control camera operations) can be received via generalized voice input tools. As another example, the image capture tool 310 can include more or fewer modules. A given module can be split into multiple modules, or different modules can be combined into a single layer. For example, the image capture engine can be split into multiple modules that control different aspects of image capture, or the image capture engine can be combined with the UI response engine and/or the rendering engine. Functionality described with reference to one module (e.g., rendering functionality) can in some cases be implemented as part of another module.

III. Exemplary Voice-Controlled Image Capture Application

Figure 4:
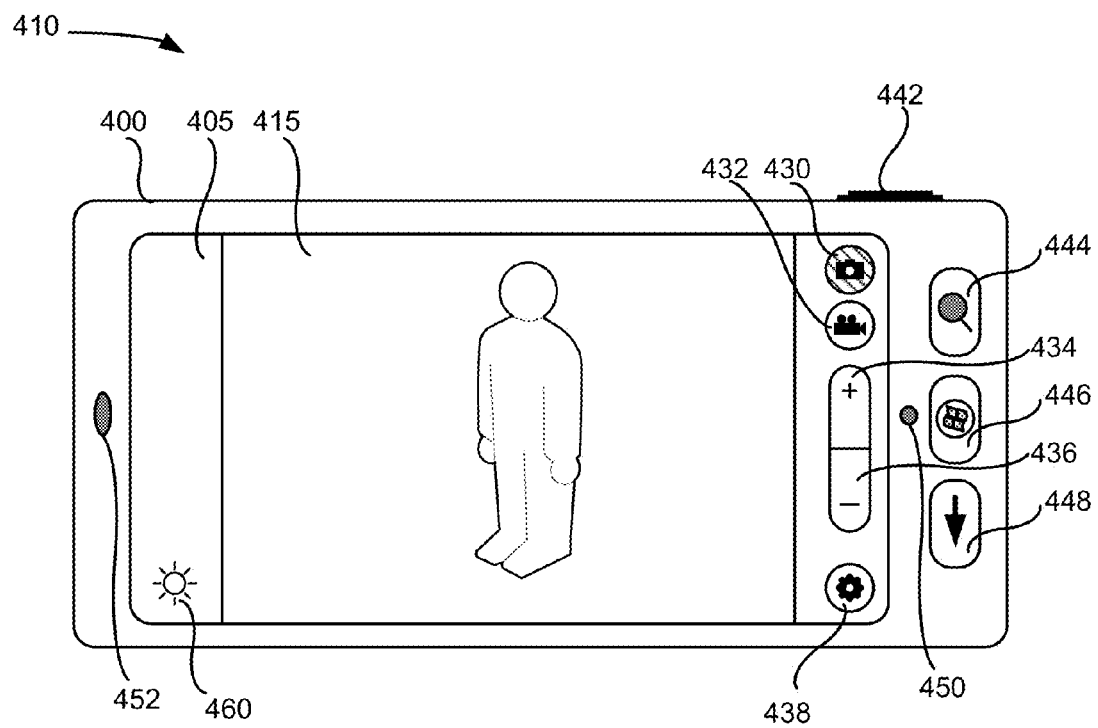
FIG. 4 is a diagram illustrating a voice-controlled image capture application presented on a touchscreen display of a mobile device.

FIG. 4 depicts a front view 410 of an example mobile device 400 displaying a graphical user interface (GUI) for a voice-controlled image-capture application on a touchscreen display 405. As shown in FIG. 4, the mobile device 400 is depicted with a viewfinder 415 on the display 405. The viewfinder 415 indicates an image that can be captured using a camera (not shown) coupled to the mobile device 400. For example, a user (not shown) can speak a voice command into microphone 450 to provide voice input that causes the mobile device 400 to capture the image shown in the viewfinder 415.

A voice command can be any word, phrase, or utterance, and can be spoken in any language at any volume, distance, or orientation that is suitable for the mobile device 400 to recognize the command. For example, in an image capture scenario, a user can speak a command while in front of the camera (e.g., during a self-portrait), behind the camera (e.g., while looking into the viewfinder), beside the camera, wearing the camera (e.g., on a helmet while riding a bicycle), or in any other orientation. A voice command can be a default command or a custom command selected by a user. Training can be used to customize commands or to make voice recognition more accurate. Training can be useful to help audio matching algorithms accurately recognize commands given by different people, or by groups of people speaking in unison, which may have different characteristics and may benefit from the use of different acoustical models for matching. A user can be given options (e.g., via a settings menu) to perform training to improve accuracy (e.g., by recording the user's voice speaking a default command) and/or to record a different command that can be used to replace a default command. Training can also take place automatically (e.g., by storing previously recognized commands) without user action. A voice command can be descriptive of the action to be taken (e.g., "capture image" or "take photo"), or some other command can be used. For example, the voice command can take the form of a word or phrase (e.g., "one . . . two . . . three!") that a photographer may use to announce that the photo is about to be taken, or that photo subjects themselves might say before the photo is taken (e.g., a word or phrase that may cause the subjects to smile, such as "fuzzy pickles!" or "cheese!" or "cheeseburgers!"). Alternatively, other types of sound (e.g., clapping hands, snapping fingers, synthesized speech or tones) besides a human voice can be used to issue a command.

The mobile device can use audio matching algorithms to compare audio input with expected commands. The determination of whether audio input is a sufficient match for an expected command can depend on factors such as training, user settings (e.g., sensitivity settings), and environmental factors (e.g., background noise). When audio input is recognized as a sufficient match for an expected command by the mobile device 400, feedback can be provided to users. Such feedback can provide assurance to users that a voice command was recognized and that mobile device 400 will take a photo momentarily. For example, visual feedback (e.g., graphics such as an animated flashing light 460 or a countdown timer or text on the display 405, a flashing light-emitting diode (LED) indicator) can be used to indicate that a voice command has been received and recognized. As another example, audio feedback (e.g., a recorded voice or tone) can be output from speaker 452 to indicate that a voice command has been received. In the example shown in FIG. 4, the mobile device 400 has received a voice command to capture an image, as indicated by the animated flashing light 460.

As shown, the display 405 of the mobile device 400 shows a still image capture mode control 430 (highlighted to indicate that still capture is the currently selected capture mode), a video capture mode control 432, zoom-in and zoom-out controls 434 and 436, and an options control 438. The mobile device 400 also includes several hardware buttons, including a camera shutter button 442 located on a side surface of the mobile device, as well as a search button 444, a home button 446, and a back button 448, which are located on a front surface of the mobile device. These hardware buttons 442, 444, 446, and 448 can be used for invoking and/or executing various operations using the mobile device 400. For example, camera shutter button 442 can be used for invoking and/or executing an image capture application, as well as controlling functions within the image capture application, such as auto-focusing and/or operating a camera shutter. Search button 444 can be used to invoke and/or execute a user interface for searching data. Home button 446 can be used for navigating software functionality on the mobile device 400 by, for example, setting the mobile device to a home screen state, or invoking other assigned functionality. Back button 448 can be used for navigating software functionality by, for example, requesting a previously requested object that was viewed using the mobile device 400.

Voice commands can be used for invoking or controlling functionality described with reference to controls and hardware buttons shown in FIG. 4 or other functionality (e.g., other image capture or image processing functionality, video or audio recording functionality). Besides commands to cause capture of images, other possible commands include commands to save a photo that has been taken (e.g., a "Keep" command), to delete a photo (e.g., a "Delete" command), to show a previously captured photo (e.g., a "Show" command), to record video or audio (e.g., a "Record" command), to stop recording video or audio (e.g., a "Stop" command). Voice commands used to control different functionality may comprise different words or phrases. Alternatively, the same word or phrase can be used as a voice command for different functionality, with the desired functionality being determined based on contextual cues. Exemplary contextual clues are described below.

Figure 5:
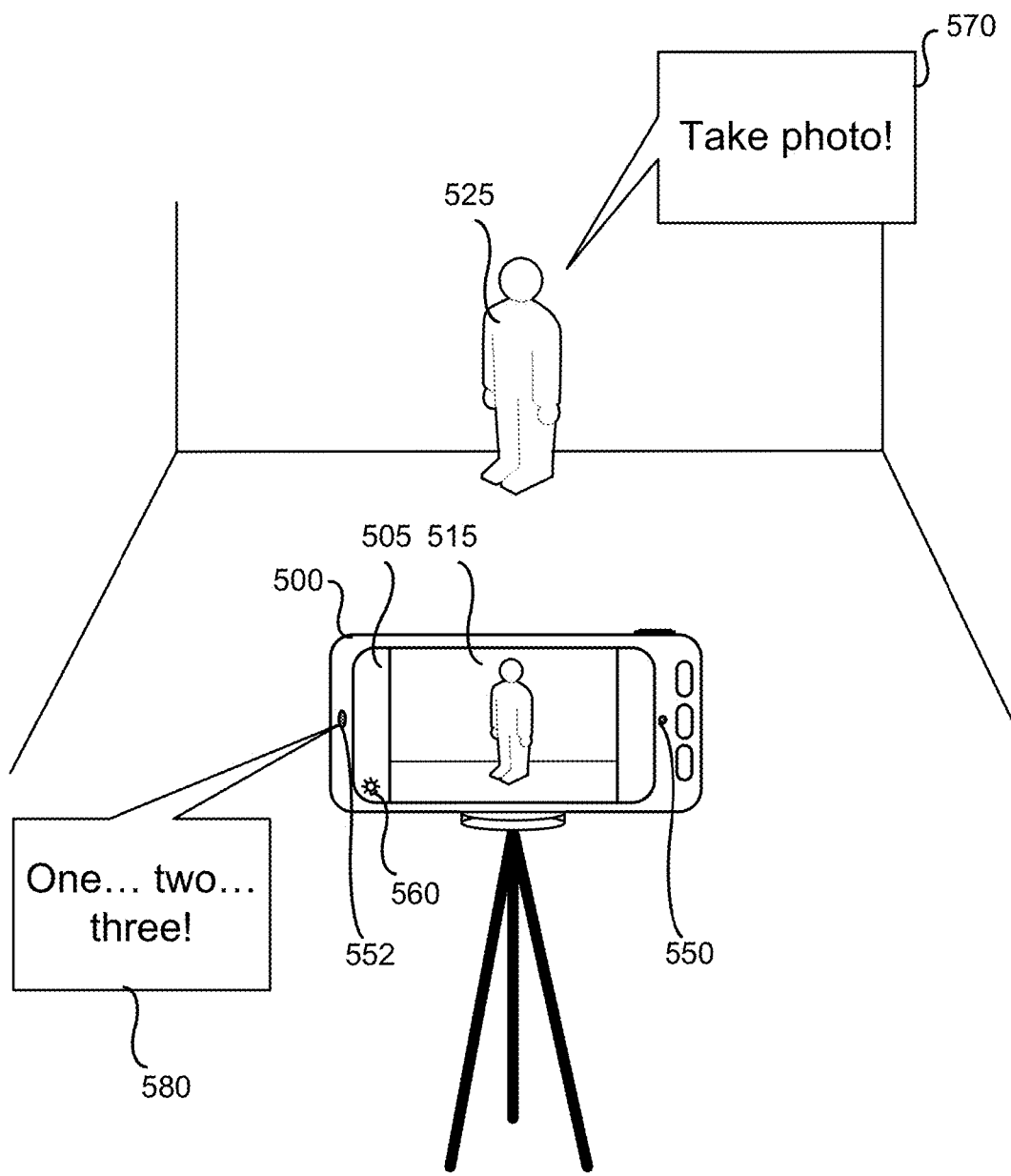
FIG. 5 is a perspective view of an example arrangement in which a voice command is received by a mobile device to cause the mobile device capture an image.

FIG. 5 is a perspective view of an example arrangement in which a user 525 utters a voice command 570 which is received by a mobile device 500 via a microphone 550, in order to cause the mobile device to capture an image. Alternatively, the voice command can be received in some other way (e.g., via a head set microphone (not shown) in communication with the mobile device 500). The mobile device 500 includes a display 505 that shows a viewfinder 515. The viewfinder 515 indicates an image to be captured. The ability of the mobile device 500 to capture an image in response to the voice command 570 allows the user 525 to stand at a distance from the mobile device and capture an image without touching the mobile device. In the example shown in FIG. 5, the image is a self-portrait of the user 525 that gives the voice command 570. An animated flashing light 560 on the display 505 indicates that the voice command has been recognized by the mobile device 500. From the perspective of the user 525, the animated flashing light 560 on the display 505 may not be visible, but other feedback can be provided. For example, other visual feedback (e.g., a flashing LED) visible to the user 525 can be used to indicate that a voice command has been recognized, or audio feedback 580 output from speaker 552 can indicate that the voice command has been recognized and can allow the user 525 to get ready (e.g., by smiling or posing) for the photo to be taken.

IV. Exemplary States for Mobile Device with Voice-Controlled Image Capture Tool

Exemplary mobile devices described herein can receive input, perform operations on data, and provide functionality to users while in several different states (e.g., locked or unlocked, active or low-power) or combinations of states. For example, in an unlocked state, a mobile device can provide full access to the functionality of the device. Typically, a mobile device in an unlocked state is also in an active state, with the display powered on and other input/output devices available for use. As another example, in a locked state, a mobile device can restrict access to functionality of the device while exhibiting behaviors such as displaying a lock screen (e.g., a screen that prompts a user for authentication information, such as a PIN or biometric data, to unlock the device), or displaying a blank screen or wallpaper. Depending on implementation, a mobile device in a locked state may still provide some functionality (e.g., image capture functionality) that can be accessed by users without unlocking the device. A locked mobile device may be in a locked/active state (e.g., with the display powered on and showing an authentication screen) or a locked/low-power (or "standby") state in which certain features of the mobile device are powered down (e.g., to reduce power consumption relative to an active state). For example, in a low-power state, the display is typically dimmed or powered off, and other components (e.g., hardware buttons, keypads, trackballs) can be deactivated, as well.

In described implementations, a mobile device having a voice-controlled image capture tool can be in a locked/active state, a locked/low-power state, an unlocked/active state, or some other state. The voice-controlled image capture tool also can exist in different states. For example, on a mobile device in an unlocked/active state, the voice-controlled image capture tool can be running in an active (or foreground) state (e.g., displaying a user interface that a user can interact with, while listening for voice commands), running in a background state (e.g., not displaying a user interface, but listening for voice commands), or "tombstoned" (e.g., terminated with some program state information preserved in order to allow the tool to restart from a previous state). As another example, on a mobile device in a locked/active state or a locked/low-power state, the voice-controlled image capture tool can be in a background state, while continuing to listen for voice commands. Alternatively, the voice-controlled image capture tool can omit listening for voice commands (e.g., to save on power consumption) in some situations, such as when the mobile device is in a locked state and/or a low-power state, either by default or based on user settings.

Behavior of the voice-controlled image capture tool can vary depending on the state of the device or the state of the tool. For example, if the voice-controlled image capture tool is running in the foreground on a mobile device in an unlocked/active state, the tool can interpret voice input and provide feedback (e.g., an animated flashing light on the display) if a voice command is recognized. As another example, if the tool is running in the background on a mobile device in an unlocked/active state, the tool can interpret voice input, switch to the foreground, and initiate image capture operations (as appropriate) if a voice command is recognized. In this manner, a user does not have to launch the image capture tool before taking a photo. The recognition of a voice command can allow the image capture tool to be launched and a command event to be generated to cause an image to be captured, even when a different application (e.g., a map application) is running in the foreground when the voice command is received.

As another example, if the voice-controlled image capture tool is running on a mobile device in a locked/active state, the tool can listen for voice commands and, if a voice command is recognized, the mobile device can, e.g., allow the voice-controlled image capture tool to perform image capture operations, display a GUI for the tool, and/or perform other image-related operations, while remaining in a locked state and restricting access to other functionality (e.g., email, text messages, contact lists, other applications). This can allow multiple users to access image capture functionality, camera settings, or the like, without compromising the privacy and security of the device for the primary user.

As another example, if the voice-controlled image capture tool is running on a mobile device in a locked/low-power state, the tool can listen for voice commands and, if a voice command is recognized, the mobile device can, e.g., transition to an active state, start the operating system, display a GUI for the tool, and generate command events to cause one or more digital images to be captured by an image capture device. Such functions can be performed while the device remains in a locked state and access to other functionality on the device is restricted. In this manner, the user does not need to put the device in an active state (e.g., by pressing a power button) before giving a voice command. After transitioning to an active state, the device can remain in an active state or return to a low-power state after a certain amount of time passes or some other event occurs (e.g., a button-press of a power button). To reduce power consumption (e.g., for devices in a low-power state), the voice-controlled image capture tool can listen for voice commands by using a low-power processor. The listening can be performed by, e.g., sampling audio input continuously or at regular time intervals. The listening can be performed in short bursts (e.g., enough time for a complete command to be spoken) to reduce power consumption.

Alternatively, other states or transitions between states can be used, or other events can cause transitions between states.

V. Exemplary Low-Power and Active State Components

Figure 6:
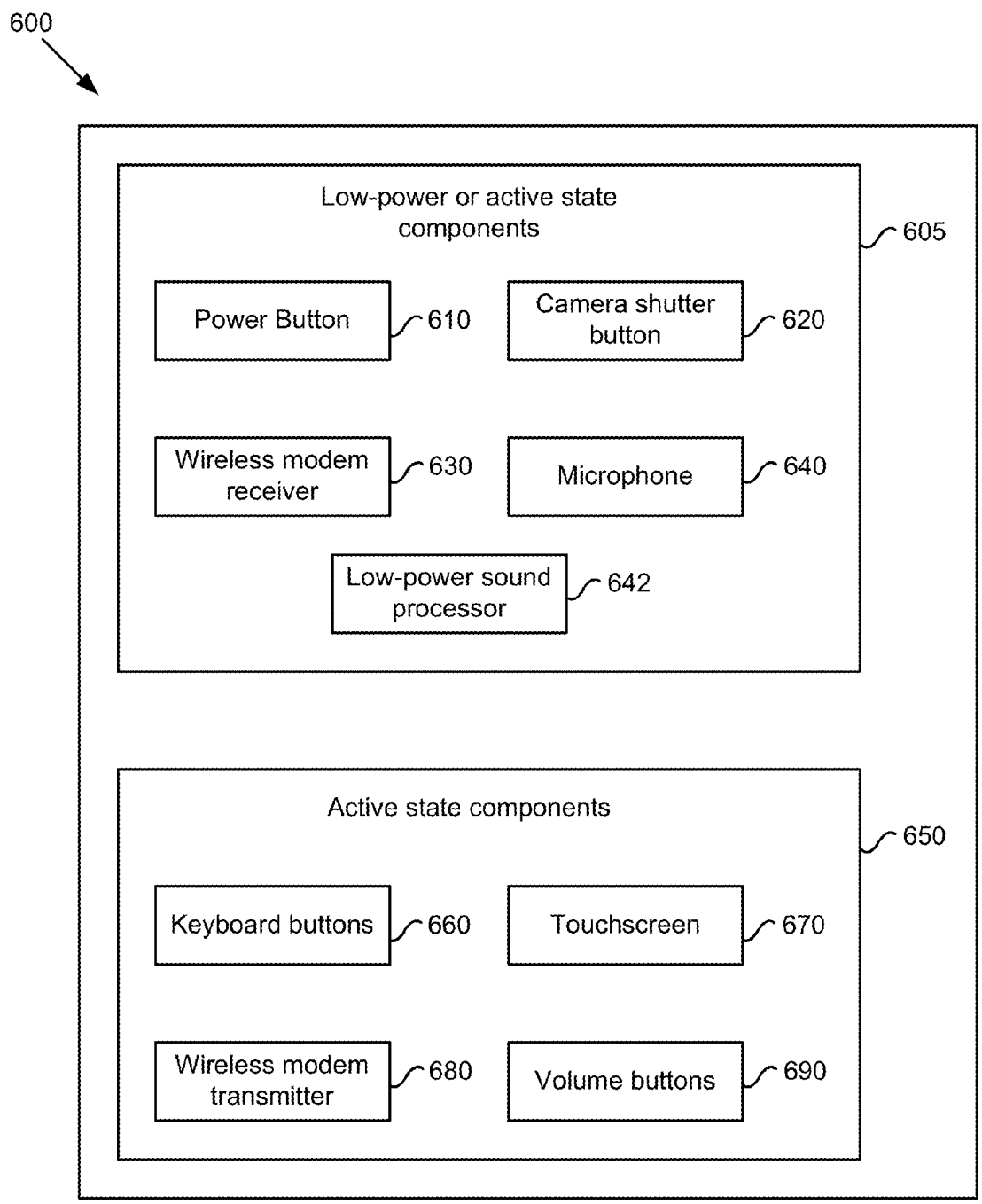
FIG. 6 is a block diagram showing example low-power components and active-state components of a mobile device.

FIG. 6 is a block diagram showing example components of a mobile device 600. In the example shown in FIG. 6, low-power/active state components 605 (e.g., power button 610, camera shutter button 620, wireless modem receiver 630, microphone 640, low-power sound processor 642) are functional when the mobile device 600 is in a low-power state or an active state, and active state components 650 (e.g., keyboard buttons 660, touchscreen 670, wireless modem transmitter 680, volume buttons 690) are functional when the mobile device 600 is in an active state, but are not functional when the mobile device is in a low-power state. Thus, only a subset of components is powered and functional when the device is in a low-power state. In the example shown in FIG. 6, keeping the microphone 640 and low-power sound processor functional in a low-power state allows the mobile device 600 to receive and recognize voice commands in a low-power state. Alternatively, components designated as low-power components can be designated as active state components, or vice versa. The components shown in FIG. 6 are not required or all-inclusive, as any components can be deleted and other components can be added.

VI. Exemplary State Diagram for Contextual Voice Command Recognition

Described voice-controlled applications can use contextual cues to assist in recognizing commands and using resources (e.g., battery life) efficiently. For example, if a camera on the mobile device is active, a voice recognition engine can listen for specific commands related to image capture functionality. This can allow the voice recognition engine to quickly dismiss some sounds (such as background noise or conversation) and focus on a command grammar and vocabulary that is relevant to the current context (e.g., words or phrases that correspond to image capture commands). Other contextual clues include which applications or functions are active on a device, time of day, and location. For example, if the time of day and location indicate that the user is at work, voice recognition relating to image capture operations can be turned off (e.g., to avoid unintended camera operation). As another example, if a voice call is active on a smart phone, voice recognition relating to image capture operations can be turned off (e.g., to avoid unintended camera operation). As another example, voice recognition relating to image capture operations can be turned off whenever the camera is not active (e.g., to reduce power consumption).

Figure 7:
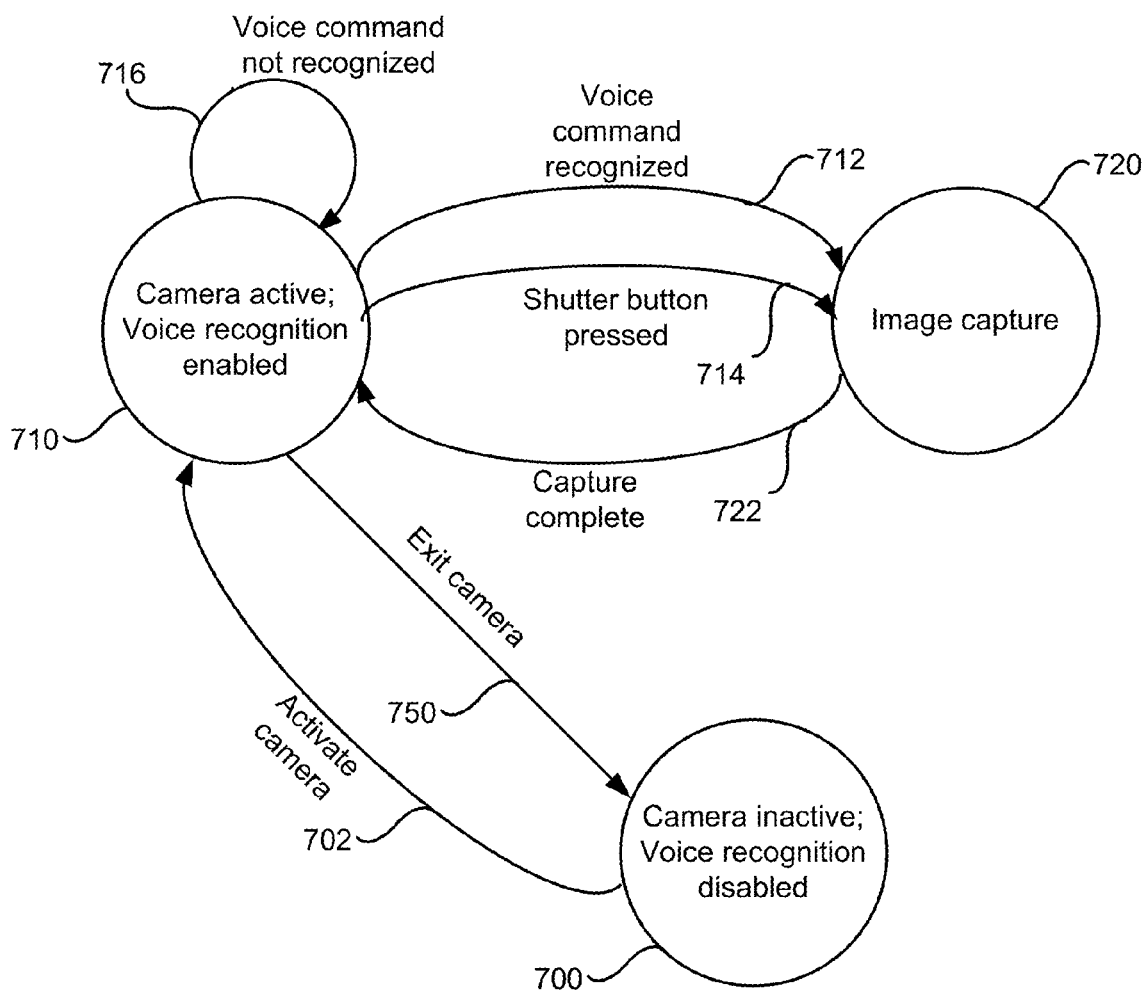
FIG. 7 is a state diagram depicting an example use of device state as a contextual cue for a voice-controlled image capture application.

FIG. 7 shows a state diagram depicting an example use of device states (e.g., the state of a mobile device having a camera and a dedicated shutter button) as contextual cues for a voice-controlled image capture application. In state 700, the camera is inactive, and voice recognition is disabled in this context (e.g., to reduce power consumption). If the camera is activated, state transition 702 leads to state 710 in which the camera is active, and voice recognition is enabled in this context (e.g., to listen for image capture voice commands). If a voice command is recognized, state transition 712 leads to state 720, in which an image capture operation is performed. Other events also can cause an image capture operation to be performed. For example, if the dedicated camera shutter button is pressed (state transition 714), an image capture operation is performed. The device can return to state 710 once an image capture operation has completed (state transition 722). If audio input is detected, but the input is not recognized as a voice command (state transition 716), the device remains in state 710. The device can continue to listen for voice commands while the camera is active. State transition 750 shows that the device can exit from the camera function (e.g., when an idle timer expires, when the user switches applications) and transition back to state 700.

The state diagram shown in FIG. 7 applies to an example voice command scenario; other possible states and state transitions based on the descriptions herein also can apply depending on implementation and on desired voice command scenarios, but are omitted from FIG. 7 for the sake of brevity. For example, other states and state transitions apply where voice recognition can run in the background when a camera is not active. As another example, other states and state transitions apply where recognition of a voice command can cause the device to transition from a low-power state to an active state. As another example, other states and state transitions can apply where other device components (e.g., a gyroscope, an accelerometer) provide additional contextual cues (e.g., detecting the orientation of the device as being ready perform an operation such as capturing an image or recording video) for recognizing voice commands.

VII. Exemplary Techniques

Figure 8:
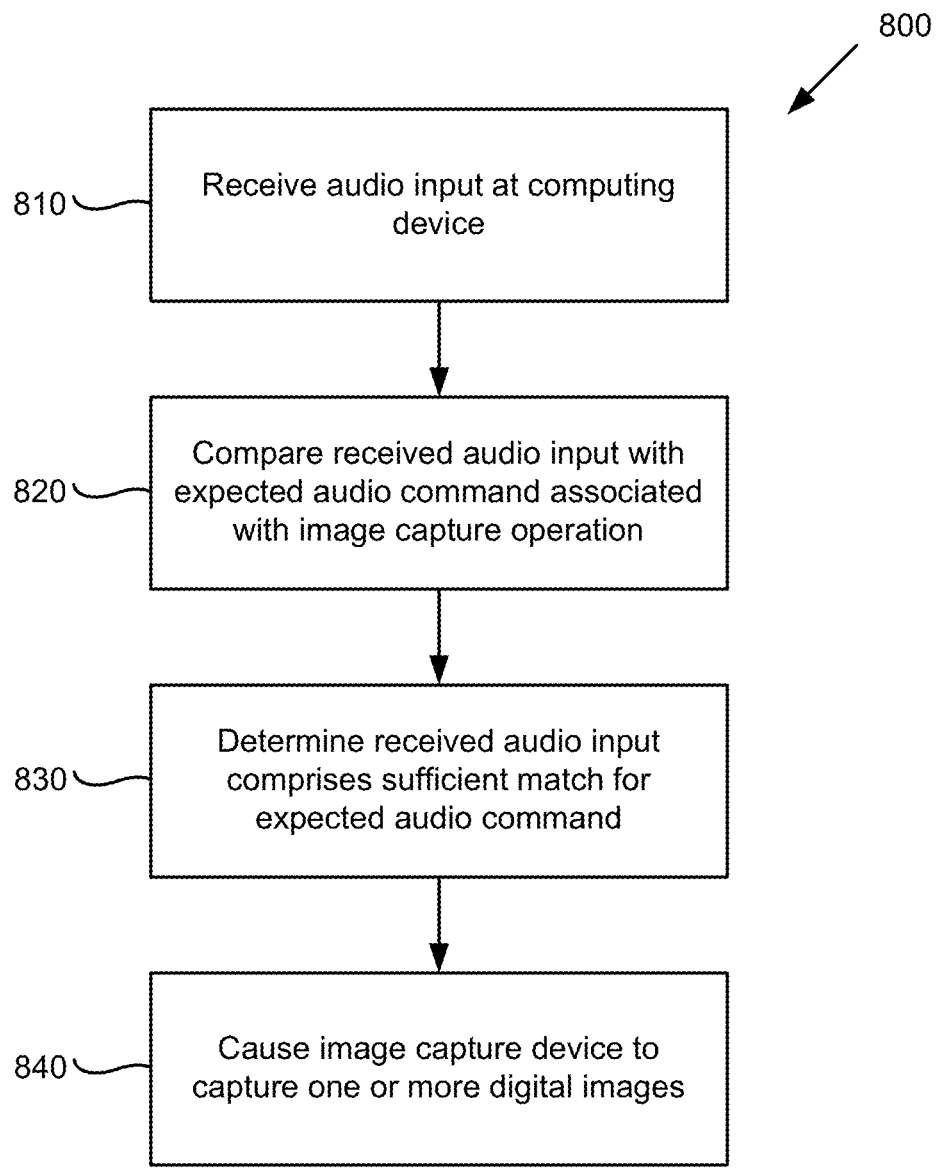
FIG. 8 is a flow chart showing an exemplary technique for causing an image capture device to capture one or more digital images based on audio command input received at a computing device.

FIG. 8 is a flow chart showing an exemplary technique 800 for causing an image capture device to capture one or more digital images based on audio command input received at a computing device. A computing device such as a smart phone or other computing device performs the technique 800.

At 810, the computing device receives audio input (e.g., voice data from one or more human voices). At 820, the computing device compares the received audio input with an expected audio command (e.g., a word or phrase) associated with an image capture operation. For example, the computing device can convert audio input to text using a speech-to-text speech recognition system, and compare the input text to an expected command word or phrase. As another example, the computing device can compare audio input with other audio data (e.g., an audio clip of the user speaking a word or phrase) that represents the expected audio command. The expected audio command can be a default command or a command selected by a user. A user can record a new command to modify or replace a default command. The expected audio command can be a member of a set of several available commands, and the available commands can be associated with the image capture operation or other functionality. The expected audio command can map to an individual function (e.g., a single image capture operation) or to a set of several functions (e.g., a macro that performs a series of different camera functions or that repeats the same function, such as an image capture operation, a number of times). The set of available commands can be shared across different applications and/or different types of computing devices (e.g., smart phones, personal computers, digital cameras, tablet computers, gaming consoles). At 830, based on the comparison at step 820, the computing device determines that the received audio input comprises a sufficient match for the expected audio command. At 840, based on the determination at step 830, the computing device causes an image capture device to capture one or more digital images.

The comparison at step 820 and the determination at step 830 can be based on statistical models (e.g., hidden Markov models) of speech characteristics. The comparison at step 820 and the determination at step 830 also can be based on training. For example, training can be performed to take characteristics of a user's speech into account to improve accuracy of recognition of voice commands. Training can occur based on user action (e.g., based on a user's selection of a training option from a setup menu) or automatically (e.g., based on previously recognized commands). The comparison at step 820 and the determination at step 830 can be performed at different locations (e.g., at a local device such as a smart phone, or at a remote server; on a general purpose processor, or on a dedicated special-purpose processor). Decisions on where to perform speech recognition tasks can be based on factors such as grammar size, nature of functions to be performed, resources available at local devices and remote servers (e.g., processing power, memory or storage capacity), and the quality of available communication links (e.g., latency in communication between a local device and a remote server). For example, for small grammar sizes (e.g., small sets of available voice commands), speech recognition tasks can be performed on a local device. As another example, for voice commands for functions where a fast response is desirable (e.g., triggering a camera shutter and capturing an image), speech recognition can be performed on a local device.

Figure 9:
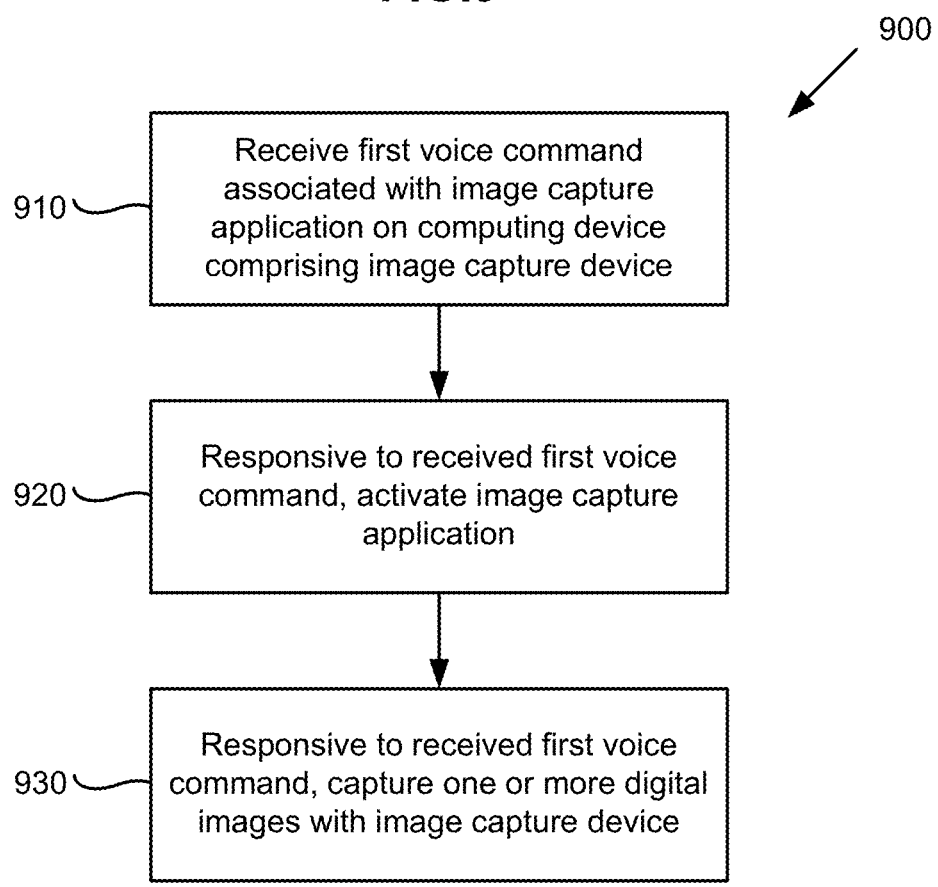
FIG. 9 is a flow chart showing an exemplary technique for activating an image capture application and capturing digital images based on a voice command.

FIG. 9 is a flow chart showing an exemplary technique 900 for activating an image capture application and capturing digital images based on a voice command. A computing device such as a smart phone or other mobile computing device performs the technique 900.

At 910, the computing device receives a first voice command associated with an image capture application on the computing device. The computing device comprises an image capture device (e.g., a digital camera). At 920, responsive to the first voice command, the computing device activates the image capture application on the computing device. For example, the image capture application transitions from a background state on the computing device to a foreground state, in response to the received voice command. At 930, responsive to the received voice command, the computing device captures one or more digital images (e.g., still images, or images in a video sequence) with the image capture device.

Figure 10:
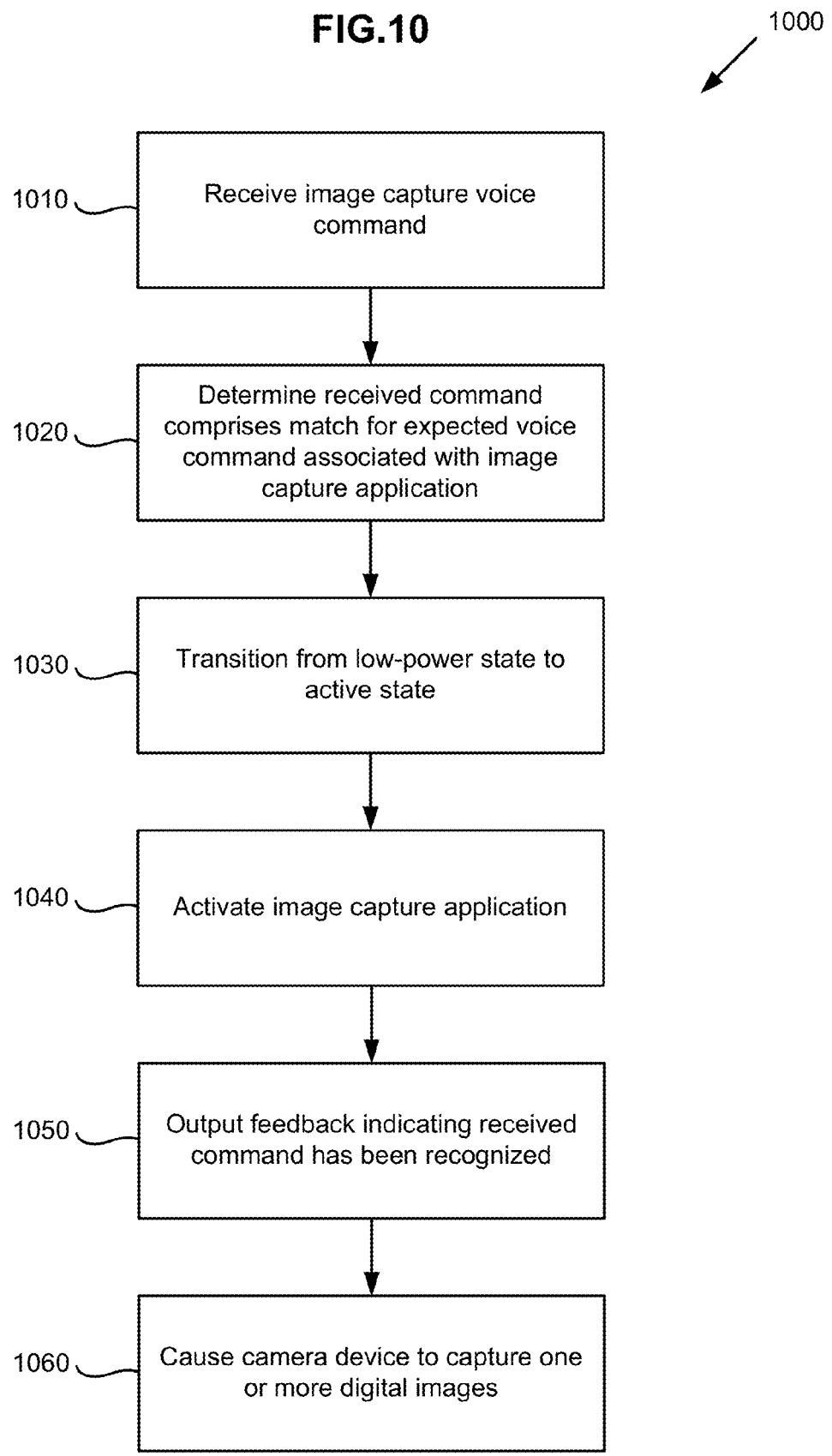
FIG. 10 is a flow chart showing an exemplary technique for transitioning from a low-power state to an active state, activating an image capture application, and causing a camera device to capture digital images based on a determination that a received voice command is a match for an expected voice command associated with an image capture application.

FIG. 10 is a flow chart showing an exemplary technique 1000 for transitioning from a low-power state to an active state, activating an image capture application, and causing a camera device to capture digital images based on a determination that a received image capture voice command is a match for an expected voice command associated with an image capture application. A computing device such as a smart phone or other computing device performs the technique 1000.

At 1010, the computing device receives an image capture voice command. For example, a mobile phone having computer-executable instructions stored in storage media that correspond to several applications (including an image capture application) operable to be executed on the mobile phone receives the image capture voice command while in a low-power state. At 1020, the computing device determines that the received command comprises a match for an expected command associated with an image capture application. At 1030, the computing device transitions from a low-power state to an active state. For example, a mobile phone in a locked, low-power state can transition to an active state (e.g., by powering up a touchscreen display and/or other components) responsive to the determination of step 1020 that the received command comprises a match for the expected command. At 1040, the computing device activates the image capture application. For example, a mobile phone with an image capture application running in the background can switch the image capture application to a foreground state responsive to the determination of step 1020. At 1050, the computing device outputs feedback (e.g., visual feedback, audio feedback) indicating that the received command was recognized as a legitimate command. At 1060, the computing device causes a camera device to capture one or more digital images. For example, a mobile phone comprising a camera device captures one or more digital images responsive to the determination of step 1020.

In any of the above techniques, any combination of the commands and operations described herein can be applied. Depending on implementation and the type of processing desired, processing stages shown in example techniques can be rearrange, added, omitted, split into multiple stages, combined with other stages, and/or replaced with like stages.

VIII. Exemplary Computing Environment

Figure 11:
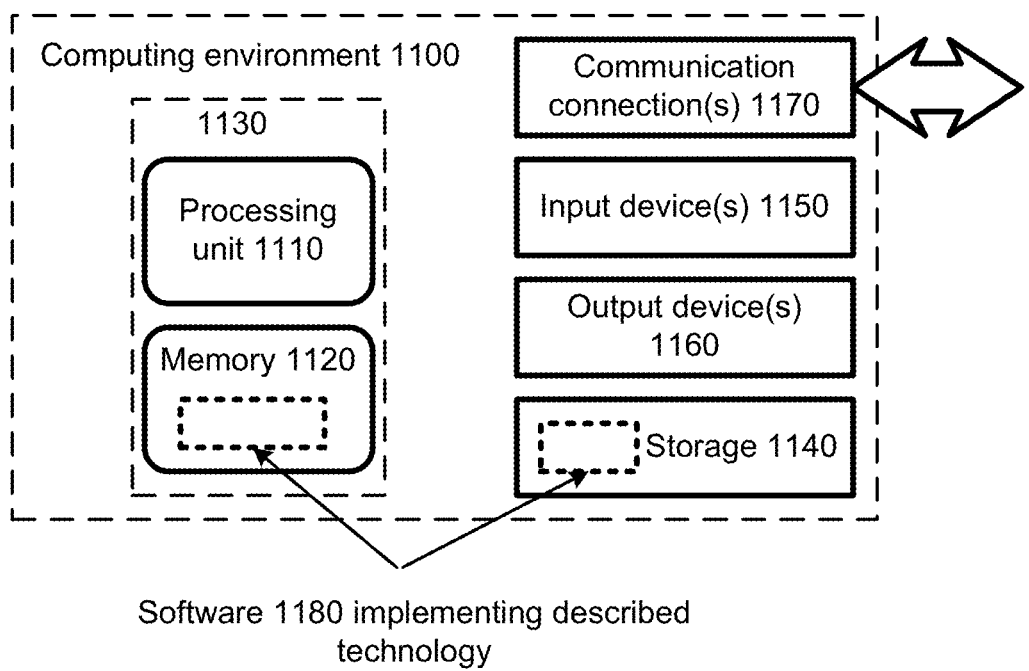
FIG. 11 is a diagram illustrating a generalized example of a suitable computing environment in which described embodiments, techniques, and technologies can be implemented.

FIG. 11 illustrates a generalized example of a suitable computing environment 1100 in which the described technologies can be implemented. The computing environment 1100 is not intended to suggest any limitation as to scope of use or functionality, as the technologies may be implemented in diverse general-purpose or special-purpose computing environments.

With reference to FIG. 11, the computing environment 1100 includes at least one processing unit 1110 coupled to memory 1120. In FIG. 11, this basic configuration 1130 is included within a dashed line. The processing unit 1110 executes computer-executable instructions. In a multi-processing system, multiple processing units execute computer-executable instructions to increase processing power. The memory 1120 may be non-transitory memory, such as volatile memory (e.g., registers, cache, RAM), non-volatile memory (e.g., ROM, EEPROM, flash memory, etc.), or some combination of the two. The memory 1120 can store software 1180 implementing any of the technologies described herein.

A computing environment may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other non-transitory computer-readable media which can be used to store information and which can be accessed within the computing environment 1100. The storage 1140 can store software 1180 containing instructions for any of the technologies described herein.

The input device(s) 1150 may be a touch input device such as a keyboard, touchscreen, mouse, pen, or trackball, a voice input device, a scanning device, or another device that provides input to the computing environment 1100. The output device(s) 1160 may be a display, printer, speaker, CD- or DVD-writer, or another device that provides output from the computing environment 1100. Some input/output devices, such as a touchscreen, may include both input and output functionality.

The communication connection(s) 1170 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., non-transitory computer-readable storage media or other tangible media). Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., non-transitory computer-readable storage media or other tangible media). Such instructions can cause a computer to perform the method. The technologies described herein can be implemented in a variety of programming languages.

Any of the methods described herein can be implemented by computer-executable instructions stored in one or more non-transitory computer-readable storage devices (e.g., memory, CD-ROM, CD-RW, DVD, or the like). Such instructions can cause a computer to perform the method.

IX. Exemplary Implementation Environment

Figure 12:
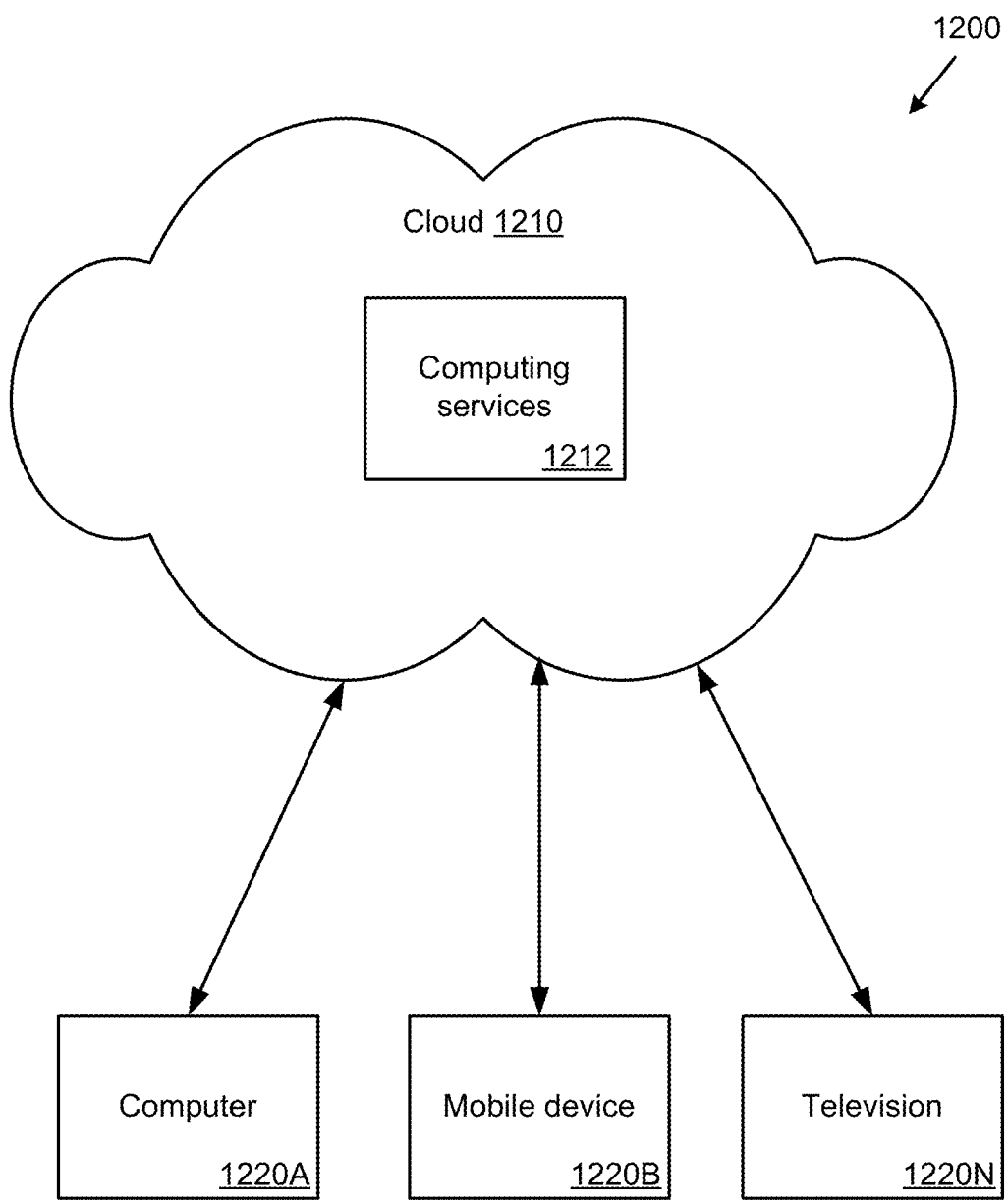
FIG. 12 is a diagram illustrating a generalized example of a suitable implementation environment in which described embodiments, techniques, and technologies can be implemented.

FIG. 12 illustrates a generalized example of a suitable implementation environment 1200 in which described embodiments, techniques, and technologies may be implemented.

In example environment 1200, various types of services (e.g., computing services 1212, which can include any of the methods described herein) are provided by a cloud 1210. For example, the cloud 1210 can comprise a collection of computing devices, which may be located centrally or distributed, that provide cloud-based services to various types of users and devices connected via a network such as the Internet. The cloud computing environment 1200 can be used in different ways to accomplish computing tasks. For example, with reference to the described techniques and tools, some tasks, such as presenting a user interface, can be performed on a local computing device, while other tasks, such as data processing or storage of data to be used in subsequent processing, can be performed elsewhere in the cloud.

In example environment 1200, the cloud 1210 provides services for connected devices with a variety of screen capabilities 1220A-N. Connected device 1220A represents a device with a mid-sized screen, For example, connected device 1220A could be a personal computer such as desktop computer, laptop, notebook, netbook, or the like. Connected device 1220B represents a device with a small-sized screen. For example, connected device 1220B could be a mobile phone, smart phone, personal digital assistant, tablet computer, and the like. Connected device 1220N represents a device with a large screen. For example, connected device 1220N could be a television (e.g., an Internet-enabled television) or another device connected to a television or projector screen (e.g., a set-top box or gaming console).

A variety of services can be provided by the cloud 1210 through one or more service providers (not shown). Cloud services can be customized to the screen size, display capability, or other functionality of the particular connected device (e.g., connected devices 1220A-N). For example, cloud services can be customized for mobile devices by taking into account the screen size, input devices, and communication bandwidth limitations typically associated with mobile devices.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
receiving audio input at a computing device;
while the computing device is in a low-power state, performing a single voice recognition event by:
comparing the received audio input with an expected audio command associated with an image capture operation, the expected audio command comprising at least one word; and
based on the comparing, determining that the received audio input matches the at least one word; and
in response to performing the single voice recognition event, without receiving further audio input, both transitioning the computing device from a low-power state to an active state and causing an image capture device to capture one or more digital images.

2. The method of claim 1 wherein the audio input comprises voice data from one or more human voices.

3. The method of claim 1 wherein the comparing is based at least in part on training.

4. The method of claim 1 wherein the comparing is based at least in part on previously recognized audio commands.

5. The method of claim 1 wherein the comparing is based at least in part on one or more contextual cues.

6. The method of claim 1 wherein the expected audio command is based at least in part on a user modification.

7. The method of claim 6 wherein the expected audio command comprises a default audio command, and wherein the user modification comprises a modification of the default audio command.

8. The method of claim 1 wherein the expected audio command is a member of a set of audio commands associated with functionality of the computing device, the set of audio commands further comprising a keep-image command, a delete-image command, a record-video command, a stop-recording command, and a show-photo command.

9. The method of claim 1 wherein the expected audio command is associated with a macro comprising a series of plural functions of the computing device.

10. The method of claim 1 wherein the expected audio command is a member of a set of audio commands associated with functionality of a plurality of computing devices comprising a smart phone, a digital camera, a tablet computer, and a gaming console.

11. The method of claim 1 wherein the computing device comprises a smart phone, and wherein the comparing is performed by the smart phone.

12. The method of claim 1 wherein the comparing is performed at least in part at a remote server.

13. The method of claim 1 wherein the comparing is performed on a dedicated processor.

14. The method of claim 1 wherein the computing device comprises a smart phone, and wherein the smart phone comprises the image capture device.

15. The method of claim 1 further comprising, based on the determining, activating an image capture application on the computing device.

16. One or more computer-readable memory or storage devices having stored thereon computer-executable instructions operable to cause a mobile computing device to perform a method comprising:
   receiving a voice command associated with an image capture application, wherein the mobile computing device comprises an image capture device controlled by the image capture application; and
   responsive to the received voice command, and without receiving additional voice commands:
      performing a single voice recognition event by determining that the received voice command includes an expected word or group of words; and
      upon performing the single voice recognition event:
         transitioning the mobile computing device from a low-power state to an active state;
         activating the image capture application; and
         capturing one or more digital images with the image capture device.

17. The computer-readable memory or storage devices of claim 16 wherein the one or more digital images comprise video images.

18. The computer-readable memory or storage devices of claim 16 wherein activating the image capture application comprises transitioning the image capture application from a background state to a foreground state.

19. A mobile device that includes one or more processors, a camera device, plural output devices, memory and storage media, the storage media storing computer-executable instructions for causing the mobile device to perform a method comprising:
   receiving an image capture voice command when the mobile device is in a low-power state, the mobile device having stored thereon computer-executable instructions corresponding to a plurality of applications operable to be executed on the mobile device, the plurality of applications comprising an image capture application and one or more other applications;
   capturing one or more digital images with the camera device through speech recognition while the mobile device remains in a device locked state by:
      determining that the received image capture voice command comprises a match for an expected voice command associated with the image capture application using speech recognition; and
      responsive to the determining:
         transitioning from the low-power state to an active state;
         activating the image capture application on the mobile device;
         outputting feedback by one or more of the output devices, the feedback indicating that the received image capture voice command has been recognized; and
         causing the camera device to capture one or more digital images.

20. The computer-readable memory or storage devices of claim 16, wherein the activating the image capture application and capturing one or more digital images with the image capture device are performed while the mobile computing device remains in a device locked state.

* * * * *